(12) United States Patent
Tanaka

(10) Patent No.: US 7,385,765 B2
(45) Date of Patent: Jun. 10, 2008

(54) OPTICAL ELEMENT

(75) Inventor: Keita Tanaka, Aichi (JP)

(73) Assignee: Sony Corporation (JP)

( * ) Notice: Subject to any disclaimer, the term of this patent is extended or adjusted under 35 U.S.C. 154(b) by 37 days.

(21) Appl. No.: 11/524,744

(22) Filed: Sep. 21, 2006

(65) Prior Publication Data

US 2007/0149939 A1    Jun. 28, 2007

(30) Foreign Application Priority Data

Sep. 22, 2005    (JP) .......................... P2005-275490

(51) Int. Cl.
*G02B 1/06*    (2006.01)
*G02B 3/12*    (2006.01)
*G02B 26/00*    (2006.01)

(52) U.S. Cl. ...................... 359/665; 359/290; 359/297; 359/666

(58) Field of Classification Search ................ 359/290, 359/291, 297, 665, 666
See application file for complete search history.

(56) References Cited

U.S. PATENT DOCUMENTS

2006/0206075 A1\* 9/2006 Tanaka et al. .............. 604/378
2007/0047119 A1\* 3/2007 Tanaka ....................... 359/896

FOREIGN PATENT DOCUMENTS

JP    2000-356792 A    12/2000

\* cited by examiner

*Primary Examiner*—David N Spector
(74) *Attorney, Agent, or Firm*—Lerner, David, Littenberg, Krumholz & Mentlik, LLP

(57) ABSTRACT

An optical element includes a sealed container having a first end wall facing a second end wall in a thickness direction, and a sidewall connecting the first and second end walls; a first polar or conductive liquid encapsulated in the container; a second liquid encapsulated in the container and not mixed with the first liquid so as to form an interface between the first liquid and the second liquid, the first liquid and the second liquid having substantially the same specific gravity and the first liquid having less light transmittance than the second liquid; and a voltage application unit configured to apply a voltage to the first liquid, wherein when a voltage is applied to the first liquid, the interface between the first liquid and the second liquid deforms to form a light transmission path that passes through the first and second end walls and extends in the thickness direction of the container.

15 Claims, 12 Drawing Sheets

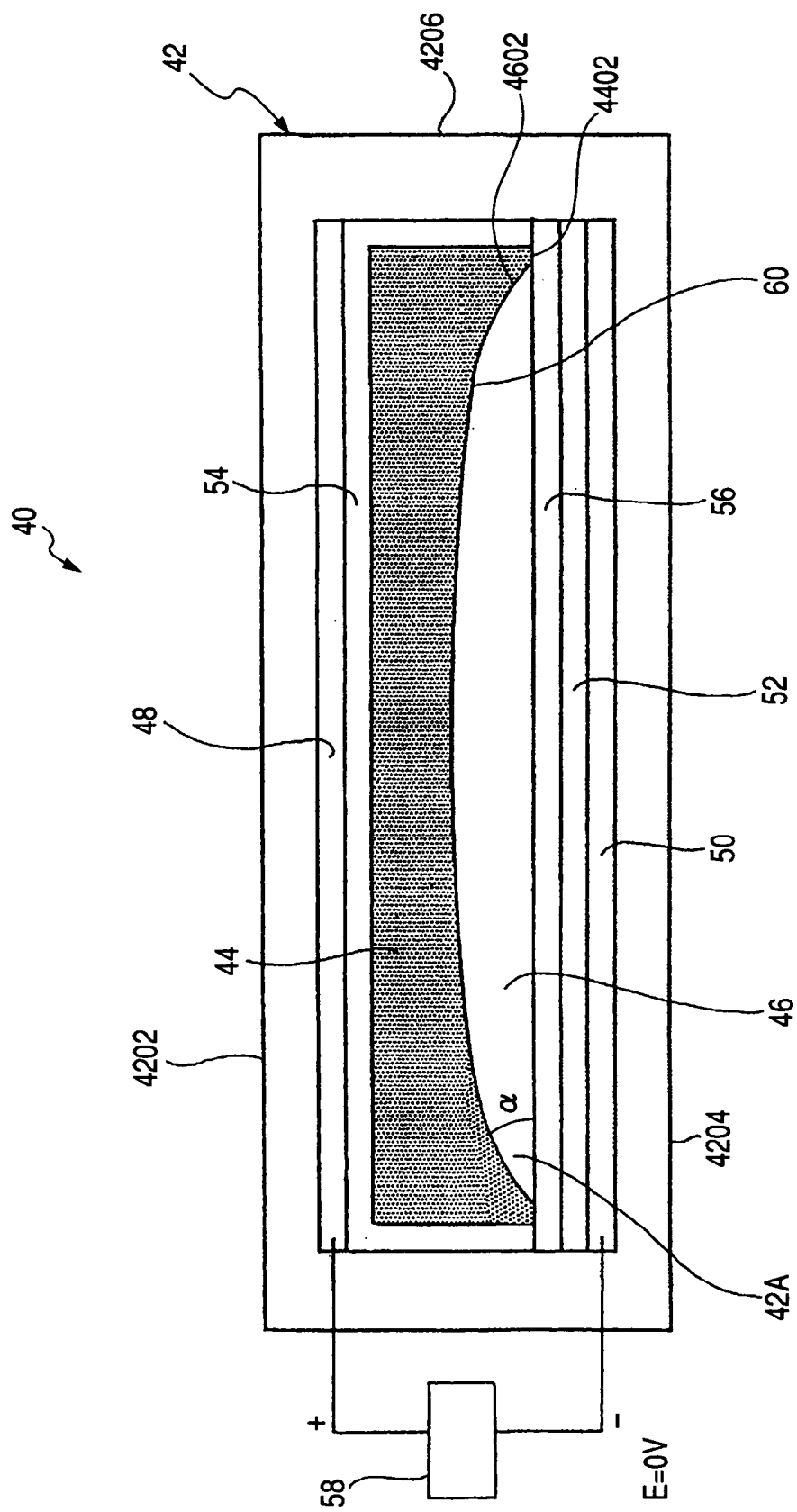

FIG. 12 SOLVENT DATA

| | | REFRACTIVE INDEX | SPECIFIC GRAVITY |
|---|---|---|---|
| GROUP A | WATER | 1.333 | 1 |
| | NITROMETHANE | 1.38056 | 1.1322 |
| | ACETIC ANHYDRIDE | 1.3904 | 1.082 |
| | METHYL ACETATE | 1.3614 | 0.9342 |
| | ETHYL ACETATE | 1.3719 | 0.902 |
| GROUP B | METHANOL | 1.3292 | 0.7915 |
| | ACETONITRILE | 1.34604 | 0.78745 |
| | ACETONE | 1.3591 | 0.788 |
| | ETHANOL | 1.361 | 0.789 |
| | PROPIONITRILE | 1.36585 | 0.7718 |
| | TETRAHYDROFURAN | 1.407 | 0.8892 |
| | n-HEXANE | 1.375 | 0.66 |
| | 2-PROPANOL | 1.37723 | 0.78505 |
| | 2-BUTANONE | 1.3814 | 0.805 |
| | n-BUTYRONITRILE | 1.38385 | 0.7954 |
| | 1-PROPANOL | 1.3862 | 0.8053 |
| | 1-BUTANOL | 1.3993 | 0.81 |
| GROUP C | DIMETHYLSULFOXIDE | 1.4795 | 1.1 |
| | CHLOROBENZENE | 1.5248 | 1.107 |
| | ETHYLENE GLYCOL | 1.43063 | 1.1135 |
| | FORMAMIDE | 1.44754 | 1.1334 |
| | NITROBENZENE | 1.5529 | 1.205 |
| | PROPYLENE CARBONATE | 1.4209 | 1.2065 |
| | 1, 2-DICHLOROETHANE | 1.4443 | 1.2569 |
| | CARBON DISULFIDE | 1.62803 | 1.2632 |
| | CHLOROFORM | 1.4476 | 1.484 |
| | BROMOBENZENE | 1.5602 | 1.4952 |
| | CARBON TETRACHLORIDE | 1.4607 | 1.589 |
| | TRICHLOROACETIC ACID ANHYDRIDE | 1.484 | 1.69 |
| GROUP D | TOLUENE | 1.4967 | 0.866 |
| | BENZENE | 1.50108 | 0.8787 |
| | ETHYLENEDIAMINE | 1.454 | 0.898 |
| | N,N-DIMETHYLACETAMIDE | 1.423 | 0.9429 |
| | N,N-DIMETHYLFORMAMIDE | 1.42803 | 0.9445 |
| | TRIBUTYL PHOSPHATE | 1.4215 | 0.976 |
| | PYRIDINE | 1.5092 | 0.98272 |
| | BENZONITRILE | 1.5289 | 1.01 |
| | ANILINE | 1.5863 | 1.022 |
| | 1, 4-DIOXANE | 1.4175 | 1.029 |
| | HEXAMETHYLPHOSPHORAMIDE | 1.4579 | 1.0295 |

OPTICAL ELEMENT

CROSS-REFERENCE TO RELATED APPLICATIONS

The present application claims priority from Japanese Patent Application No. JP 2005-275490 filed on Sep. 22, 2005, the disclosure of which is hereby incorporated by reference herein.

BACKGROUND OF THE INVENTION

1. Field of the Invention

The present invention relates to an optical element.

2. Description of the Related Art

There has been proposed an optical element 10 that adjusts the amount of transmitting light using an electrowetting phenomenon (see JP-A-2000-356792).

The optical element 10 includes, as shown in FIG. 14, a sealed container 18 having first and second end walls 12 and 14 that face each other in the thickness direction, and a sidewall 16 that connects the end walls 12 and 14; a first polar or conductive liquid 20 that is encapsulated in the container 18; and a second liquid 22 that is encapsulated in the container 18 and has a transmittance higher than that of the first liquid 20.

A first electrode 24 is formed on the entire inner surface of the first end wall 12 that faces the inside of the container 18, and a hydrophilic film 30 is formed such that it covers the first electrode 24.

A second electrode 26 is formed on the entire inner surface of the second end wall 14 that faces the inside of the container 18, and an insulating film 28 is formed such that it covers the second electrode 26.

A water repellent film 32 is formed in a circular region that is part of the insulating film 28 and centered on the center of the second end wall 14. A hydrophilic film 34 is formed in an annular region that is part of the insulating film 28 and does not include the water repellent film 32.

Using two types of liquid as the first liquid 20 and the second liquid 22 that do not mix with each other and have a same specific gravity, only the first liquid 20 and the second liquid 22 are encapsulated in the container 18 without any other substances, such as air, contained. In this way, even when the container 18 is rotated or shook, the initial state in which only the first liquid 20 and the second liquid 22 are encapsulated in the container 18 is maintained, and the state in which a curved interface K that is convex toward the first liquid 20 is formed between the first liquid 20 and the second liquid 22 is also maintained.

When no voltage is applied across the first and second electrodes 24 and 26, the second liquid 22 is positioned on the water repellent film 32, while the first liquid 20 is positioned on the hydrophilic film 34.

When a voltage is applied to the first liquid 20 from voltage application mean to induce an electrowetting phenomenon, the interface K between the first liquid 20 and the second liquid 22 is deformed from the state indicated by the solid line to the state indicated by the broken lines shown in FIG. 14. This deformation forms a light transmission path T that passes through the first and second end walls 12 and 14 and extends in the thickness direction of the container 18.

Specifically, when no voltage is applied, the first liquid 20 entirely extends in the direction perpendicular to the light transmitting direction, as indicated by the solid line in FIG. 14, so that light transmission is blocked or reduced. On the other hand, when the application voltage is increased, the second liquid 22 comes in contact with the both end walls 12 and 14 to form the transmission path T, as indicated by the broken lines in FIG. 14. By adjusting the application voltage, the contact area between the second liquid 22 and the first end wall 12 is increased or decreased, so that the size of the transmission path T is adjusted.

To apply a voltage to the first liquid 20 from the voltage application means, the first liquid 20 always needs to be positioned over the second electrode 26 via the insulating film 28.

In the related art described above, two regions are formed on the second electrode 26, that is, the circular water repellent film 32 and the annular hydrophilic film 34, so that the first liquid 20 is positioned on the annular hydrophilic film 34 irrespective of the presence or absence of the voltage.

However, the region of the hydrophilic film 34 is an unwanted region that does not contribute to the light transmission and this unwanted region occupies a certain area, which imposes limitations on reducing the dimension of the container 18 in the direction perpendicular to the light transmitting direction, creating a disadvantage in reducing the size of the optical element 10.

Under the circumstances, it is desirable to provide an optical element that provides an advantage in reducing the size thereof and a method for manufacturing the same.

SUMMARY OF THE INVENTION

According to an embodiment of the invention, there is provided an optical element including a sealed container having a first end wall facing a second end wall in a thickness direction, and a sidewall connecting the first and second end walls; a first polar or conductive liquid encapsulated inside the container; a second liquid encapsulated inside the container and not mixed with the first liquid so as to form an interface between the first liquid and the second liquid; and voltage application means for applying a voltage to the first liquid. The first liquid and the second liquid have substantially the same specific gravity and the first liquid has less light transmittance than the second liquid. The voltage application means includes a first electrode provided on the first end wall, at least part of the first electrode facing the inside of the container; a second electrode provided on the second end wall, at least part of the second electrode facing the inside of the container; and an insulating film covering the part of the second electrode facing the inside of the container. A first film whose wettability to the first liquid is higher than that to the second liquid is formed on the entire inner surface of the first end wall, on the part of the first electrode facing the inside of the container, and on the entire inner surface of the sidewall. A second film whose wettability to the second liquid is higher than that to the first liquid is formed on the entire inner surface of the second end wall, on the part of the second electrode facing the inside of the container, and on the insulating film. When a voltage is applied to the first liquid, the interface between the first liquid and the second liquid deforms to form a light transmission path that passes through the first and second end walls and extends in the thickness direction of the container. When no voltage is applied to the first liquid, the second liquid is positioned against the second film, while the first liquid entirely extends in a direction perpendicular to the light transmitting direction and an outer periphery of the first liquid that faces the inner surface of the sidewall is positioned over the second electrode via the second film and the insulating film.

According to another embodiment of the invention, there is provided a method for manufacturing an optical element, the optical element including a sealed container having a first end wall facing a second end wall in a thickness direction, and a sidewall connecting the first and second end walls; a first polar or conductive liquid encapsulated in the container; a second liquid encapsulated in the container and not mixed with the first liquid so as to form an interface between the first liquid and the second liquid; and a voltage application means for applying a voltage to the first liquid. The first liquid and the second liquid have substantially the same specific gravity and the first liquid has less light transmittance than the second liquid. When a voltage is applied to the first liquid, the interface between the first liquid and the second liquid deforms to form a light transmission path that passes through the first and second end walls and extends in the thickness direction of the container. The method includes configuring the container with a body including the first end wall, the sidewall and an open end, and a lid for enclosing the open end, the lid including the second end wall; forming a first film whose wettability to the first liquid is higher than that to the second liquid on the entire inner surface of the first end wall and on the entire inner surface of the sidewall; forming a second film whose wettability to the second liquid is higher than that to the first liquid on the entire inner surface of the second end wall; mounting the body on a mounting surface with the open end of the body oriented upward; filling the body with the first liquid to an upper end the of sidewall; pouring the second liquid on the first liquid to position the second liquid on the first liquid; and joining the lid and the upper end of the sidewall in a liquid-tight manner with the second end wall facing the upper surface of the second liquid.

With the optical element according to the embodiment of the invention, when the voltage is not applied to the first liquid, the second liquid is positioned against the second film, while the first liquid entirely extends in the direction perpendicular to the light transmitting direction and the outer periphery of the first liquid that faces the inner surface of the sidewall is positioned over the second electrode via the second film and the insulating film, allowing the voltage application means to apply a voltage to the first liquid without any problem. Therefore, unlike in the optical element of the related art, there is no need to provide a hydrophilic film that does not contribute to light transmission on the second electrode, so that the dimension of the container in the direction perpendicular to the light transmitting direction can be reduced, providing an advantage in reducing the size of the optical element. With the method for manufacturing the optical element according to another embodiment of the invention, each volume of the first liquid and the second liquid is determined and the optical element is manufactured by a simple process including the steps of pouring the first liquid into the body, pouring the second liquid on the first liquid, and closing the open end of the body with the lid, thereby providing an advantage in reducing the manufacturing cost of the optical element.

BRIEF DESCRIPTION OF THE DRAWINGS

FIG. 1 is a view for explaining the optical element 40 when no voltage is applied;

FIGS. 2A and 2B are views for explaining the principle of the electrowetting phenomenon, wherein FIG. 2A shows the state before a voltage is applied and FIG. 2B shows the state after the voltage is applied;

FIG. 12 shows values of specific gravity and refractive index of the various types of liquid to be used;

DETAILED DESCRIPTION

The present application includes subject matter related to U.S. patent application Ser. No. 11/359,416 filed on Feb. 23, 2006, U.S. patent application Ser. No. 11/365,586 filed on Mar. 2, 2006, U.S. patent application Ser. No. 11/509159 filed on Aug. 24, 2006, entitled "OPTICAL ELEMENT", and U.S. patent application Ser. No. 11/509506 filed on Aug. 24, 2006, entitled "OPTICAL ELEMENT". The disclosures of each of these applications are hereby incorporated by reference herein.

Figure 2A:
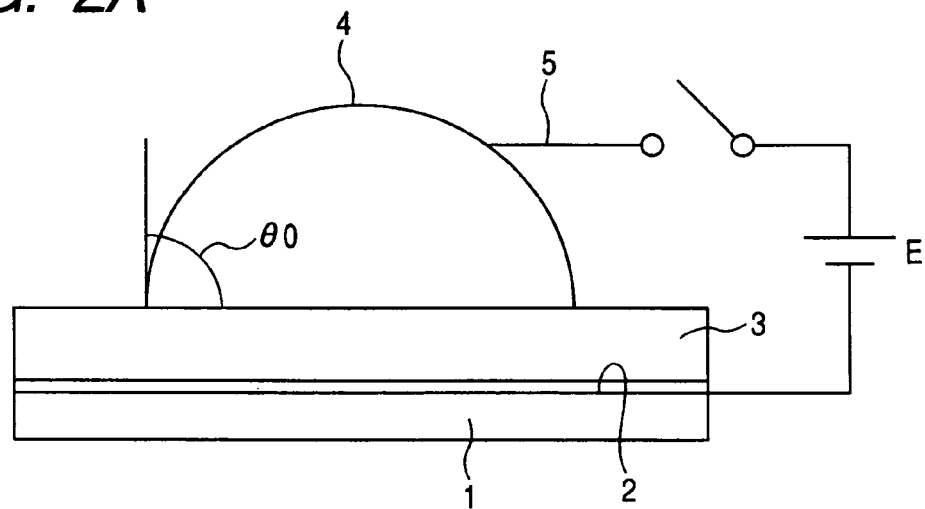
Figure 2B:
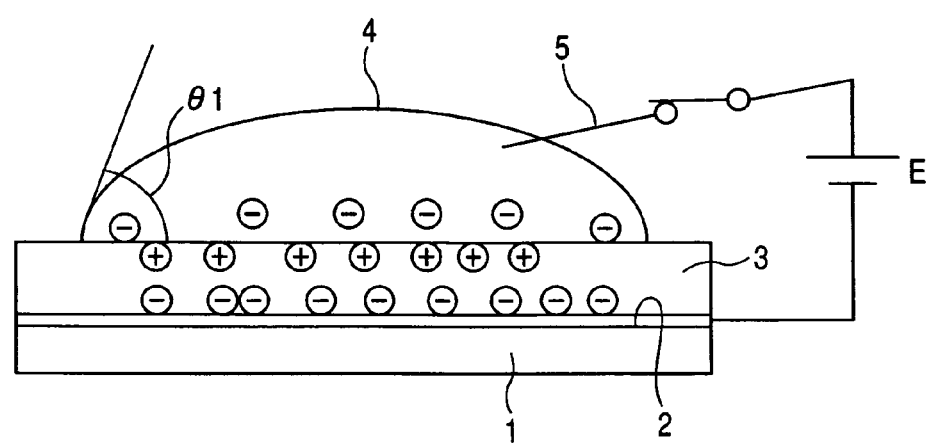

Firstly, the principle of the electrowetting phenomenon that the optical element according to an embodiment of the invention uses will be described. FIGS. 2A and 2B explain the principle of the electrowetting phenomenon, FIG. 2A showing the state before a voltage is applied and FIG. 2B showing the state after the voltage is applied. As shown in FIG. 2A, a first electrode 2 is formed on the surface of a substrate 1 and an insulating film 3 is formed on the electrode 2. A first polar or conductive liquid 4 is disposed on the surface of the insulating film 3 and the first liquid 4 is electrically connected to a second electrode 5. As shown in FIG. 2A, when a voltage E is not applied across the first electrode 2 and the second electrode 5, the first liquid 4 has a substantially spherical shape with its surface being upwardly convex by a surface tension. In this state, let the angle $\theta$ between the surface of the insulating film 3 and the liquid surface at the portion where the first liquid 4 is in contact with the insulating film 3, that is, the contact angle $\theta$ be $\theta 0$. The contact angle $\theta$ is measured when the liquid faces the air, in other words, measured at a gas-liquid interface. On the other hand, as shown in FIG. 2B, when the voltage E is applied across the first electrode 2 and the second electrode 5, the surface of the insulating film 3 is, for example, positively charged, so that an electric field (electrostatic force) acts on molecules that form the first liquid 4. The electric field attracts the molecules that form the first liquid 4, so that the wettability of the first liquid 4 with respect to the insulating film 3 increases and hence the contact angle θ becomes θ1 that is smaller than θ0. The contact angle θ decreases as the voltage E increases. Such a phenomenon is called the electrowetting phenomenon.

An optical element 40 of this embodiment will now be described. FIG. 1 is a cross-sectional view showing the configuration of the optical element 40. As shown in FIG. 1, the optical element 40 includes a container 42, a first liquid 44, a second liquid 46 and a voltage application means (voltage application unit). The container 42 has a first end wall 4202 and a second end wall 4204 that face each other in the thickness direction, as well as a sidewall 4206 that connects the first and second end walls 4202 and 4204, so that the container 42 has a compartment 42A sealed by the sidewall 4206 that connects the first and second end walls 4202 and 4204. In this embodiment, the first and second end walls 4202 and 4204 are shaped into discs with a same diameter and the sidewall 4206 is shaped into a cylinder with the same diameter as the outer diameters of the first and second end walls 4202 and 4204, so that the compartment 42A is shaped into a low-profile cylinder. The first and second end walls 4202 and 4204 and the sidewall 4206 are made of insulating materials. Furthermore, the material of the first and second end walls 4202 and 4204 is transparent to light. For example, the material that forms the first and second end walls 4202 and 4204 may be a transparent, insulating synthetic resin material or transparent glass material. A first electrode 48 (anode) is formed inside the first end wall 4202 for applying a voltage to the first liquid 44. The first electrode 48 is formed to face the inside of the container 42 such that at least part of the first electrode 48 always faces the first liquid 44. In this embodiment, the first electrode 48 is shaped into a disc and formed on the entire first end wall 4202. A second electrode 50 (cathode) is formed inside the second end wall 4204. The second electrode 50 is formed to face the inside of the container 42 such that at least part of the second electrode 50 always faces the first liquid 44. In this embodiment, the second electrode 50 is shaped into a disc and formed on the entire second end wall 4204. An insulating film 52 is formed such that it covers the entire portion of the second electrode 50 that faces the inside of the container 42. In this embodiment, the insulating film 52 is shaped into a disc such that it covers the entire second electrode 50. Therefore, when a voltage is applied across the first electrode 48 and the second electrode 50, the surface of the insulating film 52 is, for example, positively charged, so that an electric field (electrostatic force) acts on molecules that form the first liquid 44 to induce an electrowetting phenomenon. The first and second electrodes 48 and 50 are both made of a conductive material transparent to light, such as an ITO film (Indium Tin Oxide film), and the insulating film 52 is made of an insulating material transparent to light as well.

A first transparent film 54 that transmits light is formed on the entire inner surface of the first end wall 4202 including the first electrode 48 as well as the entire inner surface of the sidewall 4206. The first film 54 is configured such that its wettability to the first liquid 44 is higher than that to the second liquid 46, so that the contact angle between the first film 54 and the first liquid 44 is smaller than that between the first film 54 and the second liquid 46. The first film 54 is a film having hydrophilicity (hydrophilic film), and easily formed, for example, by applying a hydrophilic polymer or surfactant to the inner surfaces of the first end wall 4202 and the sidewall 4206. Various conventionally known materials can be used for the first film 54.

A second transparent film 56 that transmits light is formed on the entire inner surface of the second end wall 4204 including the second electrode 50 and the insulating film 56. The second film 56 is configured such that its wettability to the second liquid 46 is higher than that to the first liquid 44. That is, when the contact angle between the second film 56 and the second liquid 46 is measured in the air (at the gas-liquid interface), as in FIG. 2A, the measured contact angle is smaller than that between the second film 56 and the first liquid 44. Therefore, as shown in FIG. 1, the angle α between the second film 56 and the second liquid 46 is, for example, within the range between 0 to 30 degrees. The angle within this range is smaller than the contact angle between a water repellent film made of typical fluororesin and the second liquid 46. The second film 56 is a lipophilic film and can be formed, for example, by baking a material primarily made of silicon or by vapor depositing a material made of amorphous fluororesin. Various conventionally known materials can be used for the second film 56.

A variable output voltage power supply 58 is provided outside the container 42. The positive voltage output terminal of the power supply 58 is electrically connected to the first electrode 48, while the negative voltage output terminal of the power supply 58 is electrically connected to the second electrode 50. The first electrode 48, second electrode 50, insulating film 52 and power supply 58 form the voltage application unit.

The first liquid 44 is polar or conductive liquid and encapsulated in the container 42. The second liquid 46, which does not mix with the first liquid 44, is also encapsulated in the container 42. The first liquid 44 and the second liquid 46 have a substantially same specific gravity, and the transmittance of the first liquid 44 is lower than that of the second liquid 46. In this embodiment, the second liquid 46 is made of silicon oil, while the first liquid 44 is made of a mixture of pure water, ethanol and ethylene glycol and the specific gravity and refractive index of the mixture are adjusted to be substantially the same as those of the silicon oil. When the second liquid 46 is a silicon oil and the second film 56 is formed by baking a material primarily made of silicon or formed of a material made of amorphous fluororesin, as described above, the wettability of the second liquid 46 to the second film 56 is extremely high, so that the contact angle between the second liquid 46 and the second film 56 is extremely small. For example, in FIG. 1, the angle α between the second liquid 46 and the second film 56 is within the range between 0 and 20 degrees.

The portion of the first liquid 44 that is located on the inner surface of the first end wall 4202 where the first liquid 44 is disposed entirely faces the first electrode 48 via the first film 54, while the portion of second liquid 46 that is located on the inner surface of the second end wall 4204 where the second liquid 46 is disposed entirely faces the second electrode 50 via the second film 56 and the insulating film 52. Therefore, when the voltage is applied across the first and second electrodes 48 and 50 from the power supply 58, the surface of the insulating film 52 is charged, so that an electric field (electrostatic force) acts on molecules that form the first liquid 44.

The operation of the optical element 40 will now be described. As shown in FIG. 1, when no voltage is applied across the first and second electrodes 48 and 50 from the power supply 58 (E=0 V), the shape of the interface 60 between the first liquid 44 and the second liquid 46 is determined by the balance among the surface tension of the first liquid 44, the surface tension of the second liquid 46 and the interfacial tension on the second film 56. The second liquid 46 is positioned on the second film 56 on the second end wall 4204, while the first liquid 44 is positioned such that it covers the first film 54 on the first end wall 4202 as well as the first film 54 on the sidewall 4206. At part of the sidewall 4206 (second film 56), the first liquid 44 intrudes in the region of the second liquid 46 along the sidewall 4206. Specifically, the outer periphery 4402 of the first liquid 44 that faces the inner surface of the sidewall 4206 is positioned over the second electrode 50 via the second film 56 and the insulating film 52 without the second liquid 46 interposed between the first liquid 44 and the second electrode 50, while the outer periphery 4602 of the second liquid 46 that faces the inner surface of the sidewall 4206 faces the sidewall 4206 with the first liquid 44 interposed between the second liquid 46 and the sidewall 4206. Such a positional relationship between the first liquid 44 and the second liquid 46 results from the first film 54 formed of a hydrophilic film formed on the sidewall 4206, in other words, due to the fact that the contact angle between the first film 54 and the first liquid 44 differs from that between the first film 54 and the second liquid 46. The outer periphery 4402 of the first liquid 44 that faces the inner surface of the sidewall 4206 is thus positioned over the second electrode 50 via the second film 56 and the insulating film 52 without the second liquid 46 interposed between the first liquid 44 and the second electrode 50, allowing a voltage from the second electrode 50 to be applied to the first liquid 44. The first liquid 44 now entirely extends in the direction perpendicular to the light transmitting direction, so that the light traveling in the thickness direction of the container 40 is blocked.

Figure 3:
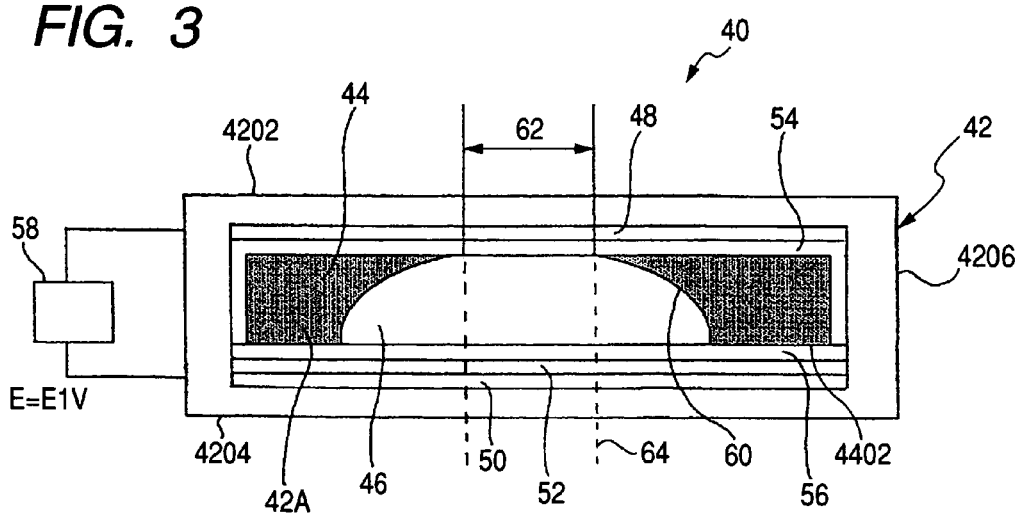
FIG. 3 is a view for explaining the state in which the first voltage E1 is applied to the optical element 40.

When the voltage E is applied across the first and second electrodes 48 and 50 from the power supply 58, the interface 60 deforms, due to the electrowetting phenomenon, to be a curved surface (spherical surface) that is convex from the second liquid 46 toward the first liquid 44. That is, the center of the interface 60 approaches the first end wall 4202, so that the thickness of the first liquid 44 is smallest (thinnest) at the center, while the thickness increases (becomes thicker) at locations closer to the periphery of the compartment 42A away from the center. The contact angle between the first liquid 44 and the second film 56 is now smaller than 90 degrees, and at the sidewall 4206 (second film 56), the first liquid 44 intrudes in the region of the second liquid 46 along the sidewall 4206 (the second film 56) to a greater extent as compared to the case where the voltage is not applied across the first and second electrodes 48 and 50. Now, the outer periphery 4402 of the first liquid 44 is of course still positioned over the second electrode 50, and the area of the outer periphery 4402 of the first liquid 44 that is positioned over the second electrode 50 is larger as compared to the case where the voltage is not applied across the first and second electrodes 48 and 50. Furthermore, when the voltage E increases to a first voltage E1, the curvature of the convexly curved (spherical) surface of the interface 60 becomes larger, as shown in FIG. 3, so that the center of the interface 60 comes in contact with the first end wall 4202 (first film 54). Thus, the first liquid 44 is not present in the region where the interface 60 is in contact with the first end wall 4202 (first film 54), so that a region 62 where only the second liquid 46 is present is formed at the center of the compartment 42A (at the centers of the first and second end walls 4202 and 4204). The region 62 forms a light transmission path 64 that passes through the first and second end walls 4202 and 4204 and extends in the thickness direction of the container 42.

Figure 4:
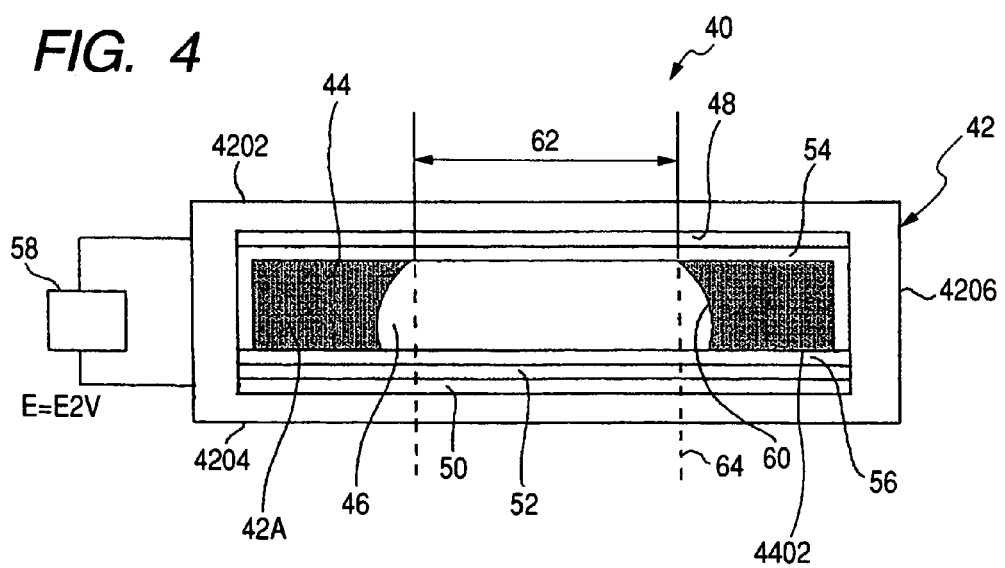
FIG. 4 is a view for explaining the state in which the second voltage E2 greater that the first voltage is applied to the optical element 40.

When a second voltage E2 greater than the first voltage E1 (E2>E1) is applied across the first and second electrodes 48 and 50 from the power supply 58, the curvature of the convexly curved (spherical) surface of the interface 60 becomes even larger, as shown in FIG. 4. Then, the diameter of the region 62, where only the second liquid 46 is present, formed at the center of the compartment 42A (at the centers of the first and second end walls 4202 and 4204) is enlarged, so that the diameter of the light transmission path 64 is enlarged. Therefore, by adjusting the voltage applied across the first and second electrodes 48 and 50 from the power supply 58, the diameter of the region 62 where only the second liquid 46 is present can be enlarged or reduced, allowing a diaphragm operation in which the diameter of the light transmission path 64 is enlarged or reduced.

According to this embodiment, the first film 54 whose wettability to the first liquid 44 is higher than that to the second liquid 46 is formed on the entire inner surface of the first end wall 4202 including the first electrode 48 as well as the entire inner surface of the sidewall 4206. Thus, when the voltage is not applied from the voltage application unit, the second liquid 46 is positioned on the second film 56, while the first liquid 44 entirely extends in the direction perpendicular to the light transmitting direction and the outer periphery of the first liquid 44 that faces the inner surface of the sidewall 4206 is positioned over the second electrode 50 via the second film 56 and the insulating film 52, allowing the voltage application unit to apply a voltage to the first liquid 44 without any problem. Therefore, unlike in the optical element of the related art, there is no need to provide a hydrophilic film that does not contribute to light transmission on the second electrode 50, so that the dimension of the container 42 in the direction perpendicular to the light transmitting direction can be reduced, providing an advantage in reducing the size of the optical element 40.

According to this embodiment, as the first film 54 is formed on the first end wall 4202 on the first liquid 44 side, the first liquid 44 well wets the first film 54. Therefore, this arrangement facilitates the separation of the second liquid 46 from the first film 54, when the second liquid 46 temporarily comes in contact with the first end wall 4202 and then separates therefrom, providing an advantage in increasing the operation speed of the diaphragm. Furthermore, as the second film 56 is formed on the second end wall 4204 where the second liquid 46 is disposed, this arrangement facilitates a smooth movement of the liquid surface of the first liquid 44 on the second film 56 when the first liquid 44 is positioned on the second film 56, providing an advantage in increasing the operation speed of the diaphragm.

In this embodiment, although the description has been made as to the case where the first electrode 48 is formed on the entire first end wall 4202, the first electrode 48 may be differently formed as long as when a voltage is applied to the first electrode 48, the first electrode 48 can apply the voltage to the first liquid 44 to change the shape of the interface between the first liquid 44 and the second liquid 46. Therefore, the first electrode 48 is not necessarily formed on the entire first end wall 4202. That is, as part of the first liquid 44 always faces the outer peripheral of the first end wall 4202 irrespective of the change in shape of the interface 60, the first electrode 48 may be formed at the outer peripheral of the first end wall 4202 that the first liquid 44 always faces, so that the first electrode 48 can apply the voltage to the first liquid 44. When the first electrode 48 is thus formed at the outer peripheral of the first end wall 4202, the first electrode 48 is not present in the light transmission path 64, thereby providing an optically advantageous arrangement. Since the size of the light transmission path 64 at the first end wall 4202 changes as the shape of the interface 60 changes, the first electrode 48 may be formed in an annular region that does not include the region of the maximized light transmission path 64 at the first end wall 4202, so that the first electrode 48 can apply the voltage to the first liquid 44. When the first electrode 48 is thus formed at the annular region that does not include the region of the maximized light transmission path 64 at the first end wall 4202, again, the first electrode 48 is not present in the light transmission path 64, thereby providing an optically advantageous arrangement. Furthermore, the entire first electrode 48 is not necessarily disposed inside the container 42 as long as at least part of the first electrode 48 faces the inside of the container 42. The remaining portion of the first electrode 48 may of course be disposed outside the container 42 through the first end wall 4202 or the sidewall 4206.

In this embodiment, although the description has been made as to the case where the second electrode 50 is formed on the entire second end wall 4204, the second electrode 50 may be differently formed as long as when a voltage is applied to the second electrode 50, the second electrode 50 can apply the voltage to the first liquid 44 via the insulating film 52 to change the shape of the interface between the first liquid 44 and the second liquid 46. Therefore, the second electrode 50 is not necessarily formed on the entire second end wall 4204. That is, as part of the first liquid 44 always faces the outer peripheral of the second end wall 4204 irrespective of the change in shape of the interface 60, the portion of the first liquid 44 that faces the outer periphery of the second end wall 4204 is enlarged or reduced in the radial direction of the light transmission path 64 as the shape of the interface 60 changes. Therefore, the second electrode 50 may be disposed at the portion of the outer periphery of the second end wall 4204 that is enlarged or reduced in the radial direction, so that the second electrode 50 can apply the voltage to the first liquid 44 via the insulating film 52. When the second electrode 50 is thus disposed at the portion of the outer periphery of the second end wall 4204 that is enlarged or reduced in the radial direction, the second electrode 50 is not present in the light transmission path 64, thereby providing an optically advantageous arrangement. Moreover, as the light transmission path 64 passes through the centers of the first and second end walls 4202 and 4204 and extends in the thickness direction of the container 42 and the size of the light transmission path 64 at the second end wall 4204 changes as the shape of the interface 60 changes, the second electrode 50 may be formed in an annular region that does not include the region of the maximized light transmission path 64 at the second end wall 4204, so that the second electrode 50 can apply a voltage to the first liquid 44 via the insulating film 52. When the second electrode 50 is thus formed at the annular region that does not include the region of the maximized light transmission path 64 at the second end wall 4204, again, the second electrode 50 is not present in the light transmission path 64, thereby providing an optically advantageous arrangement.

Figure 5A:
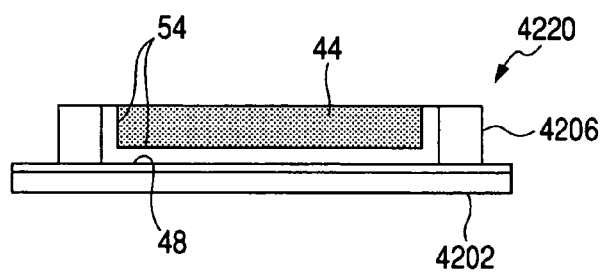
FIGS. 5A to 5C are views for explaining the manufacturing process of the optical element 40.
Figure 5B:
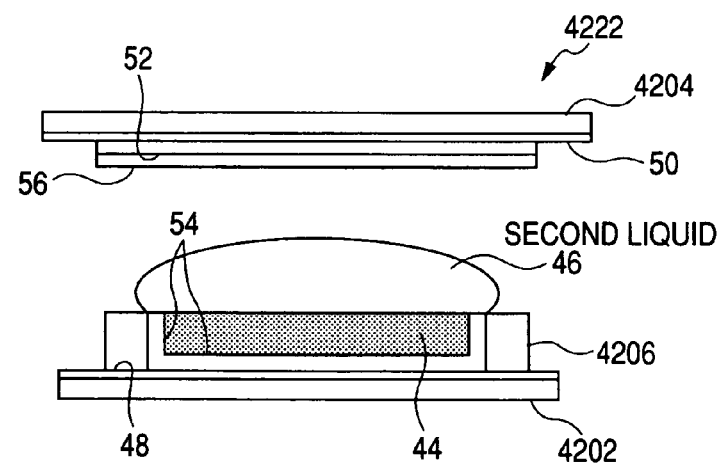
Figure 5C:
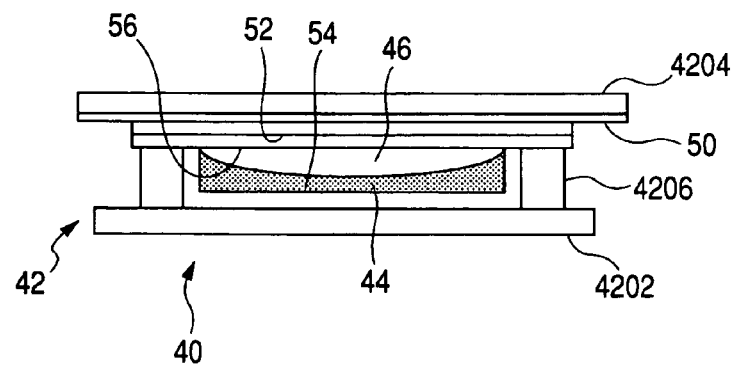

A method for manufacturing the optical element 40 will now be described. FIGS. 5A to 5C explain manufacturing processes of the optical element 40. As shown in FIGS. 5A and 5B, the container 42 includes two members; a body 4220 having the first end wall 4202 and the sidewall 4206, and a lid 4222 having the second end wall 4204. The first electrode 48 is formed by vapor depositing an ITO film or the like on the entire first end wall 4202 of the body 4220. Hydrophilic polymer, surfactant or the like is then applied to the entire inner surface of the first end wall 4202 and the entire inner surface of the sidewall 4206 to form the first film 54. As shown in FIG. 5B, the second electrode 50 is formed by preparing the second end wall 4204 and vapor depositing an ITO film or the like on the entire second end wall 4204, and the insulating film 52 is formed to cover the entire second electrode 50. Then, the second film 56 is formed, for example, by baking a material primarily made of silicon or depositing a material made of amorphous fluororesin such that the entire insulating film 52 is covered.

Thereafter, as shown in FIG. 5B, the body 4220 is mounted on a mounting surface with the space surrounded by the first end wall 4202 and the sidewall 4206 oriented upward. Subsequently, the first liquid 44 is poured to fill the space of the body 4220 to the upper end of the sidewall 4206. Then, the second liquid 46 is poured on the top of the first liquid 44. The second liquid 46 is positioned on the top of the first liquid 44 under the balance among the surface tension of the first liquid 44, the surface tension of the second liquid 46 and the interfacial tension on the first film 54. In other words, the second liquid 46 is positioned above the upper end of the sidewall 4206 with the outer surface of the second liquid 46 being curved and outwardly convex. Then, the body 4220 and the lid 4222 are brought closer to each other with the second end wall 4204 oriented downward, that is, the second film 56 facing the upper surface of the second liquid 46. Then, the outer periphery of the second end wall 4204 is pressed against the upper end of the sidewall 4206 to close the space in the body 4220, as shown in FIG. 5C. In this process, as the second liquid 46 is positioned above the upper end of the sidewall 4206, the second liquid 46 is displaced by the second end wall 4204 and overflows out of the sidewall 4206. However, due to the good wettability of the second liquid 46 to the second film 56 of the second end wall 4204, the second liquid 46 is positioned such that it spreads out into a low-profile shape on the second film 56 of the second end wall 4204. As a result, the shape of the interface 60 between the first liquid 44 and the second liquid 46 is determined by the balance among the surface tension of the first liquid 44, the surface tension of the second liquid 46 and the interfacial tension on the second film 56. Then, the second liquid 46 is positioned on the second film 56 on the second end wall 4204, while the first liquid 44 is positioned such that it covers the first film 54 on the first end wall 4202 and the first film 54 on the sidewall 4206. The shape of the interface 60 between the first liquid 44 and the second liquid 46 is thus determined, so that each volume of the first and second liquid 44 and 46 in the container 42 is determined. Then, as shown in FIG. 1, the outer periphery 4402 of the first liquid 44 that faces the inner surface of the sidewall 4206 is positioned over the second electrode 50 via the second film 56 and the insulating film 52 without the second liquid 46 interposed between the first liquid 44 and the second electrode 50, while the outer periphery 4602 of the second liquid 46 that faces the inner surface of the sidewall 4206 faces the sidewall 4206 with the first liquid 44 interposed between the second liquid 46 and the sidewall 4206. Then, the outer periphery of the second end wall 4204 and the upper end of the sidewall 4206 are joined with an adhesive or the like (not shown) in a liquid tight manner to seal the container 42, and the optical element 40 is thereby completed.

According to such a manufacturing method, each volume of the first liquid 44 and the second liquid 46 is determined and the optical element 40 is manufactured by a simple process including the steps of pouring the first liquid 44 into the space in the body 4220, pouring the second liquid 46 on the first liquid 44, and closing the space in the body 4220 with the lid 4222, thereby providing an advantage in reducing the manufacturing cost of the optical element 40.

Figure 14:
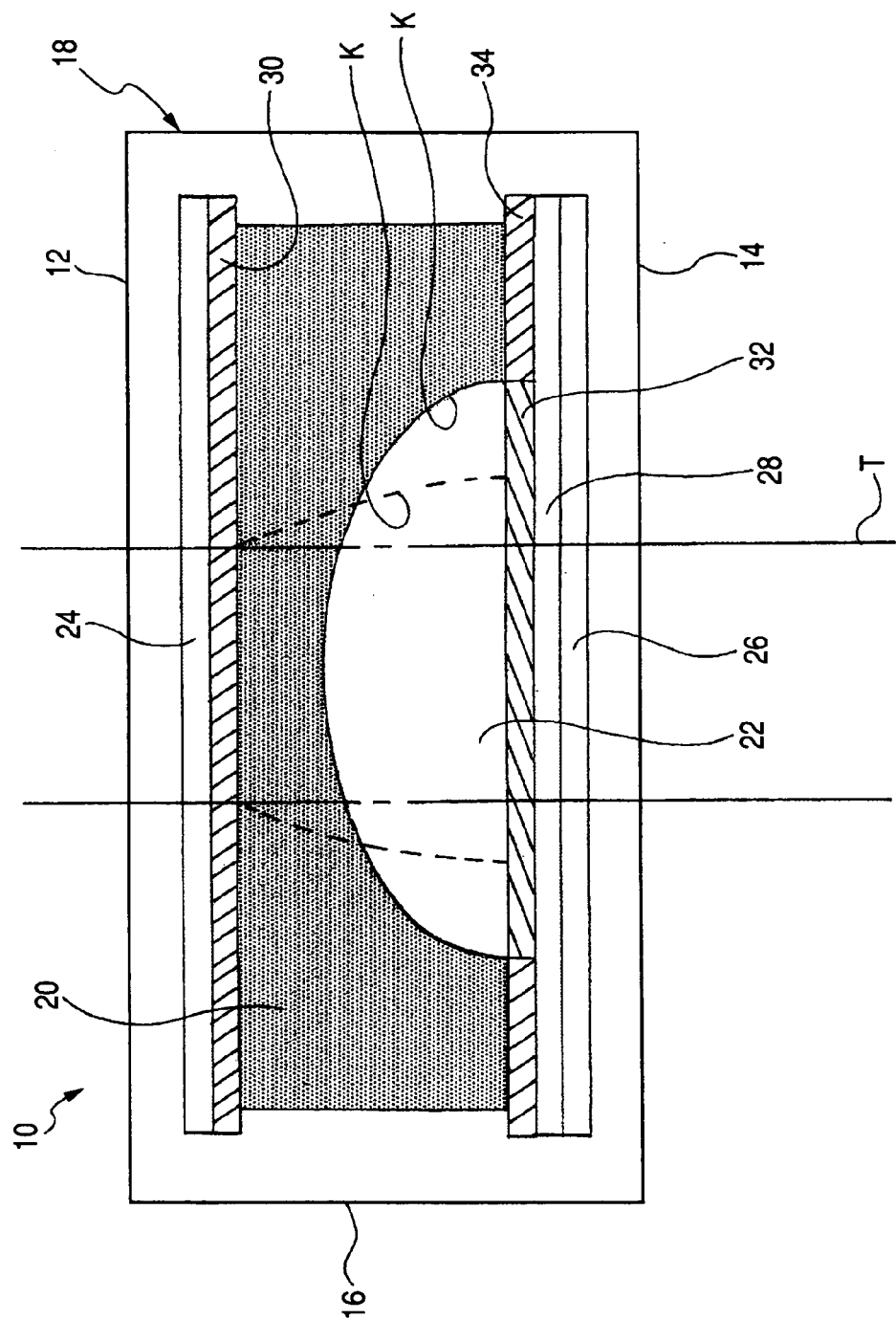
FIG. 14 shows the configuration of the optical element 10 of the related art.
Figure 15:
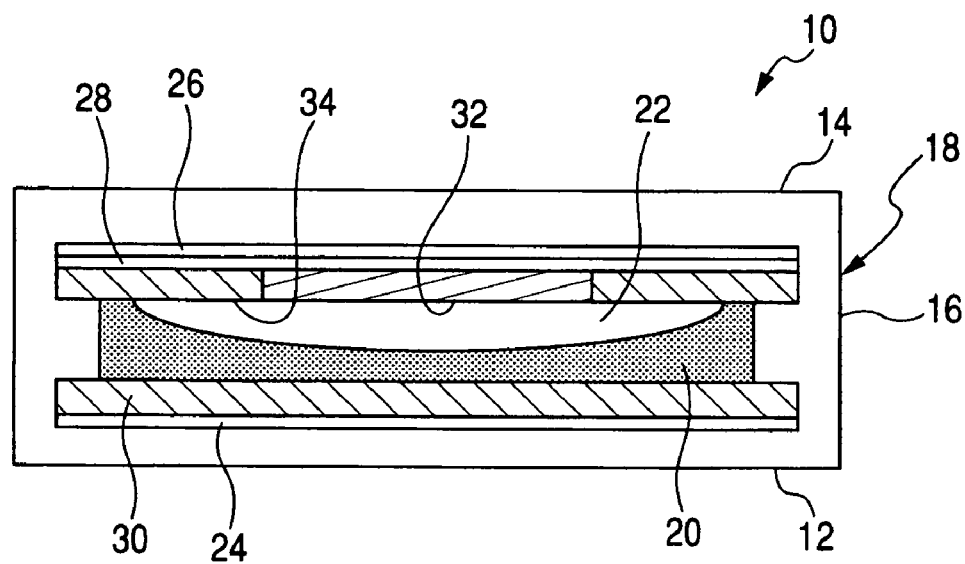
FIG. 15 is a view for explaining the case where the manufacturing method according to this embodiment is applied to the optical element 10 of the related art.

Description will be given as to a comparison example in which the manufacturing method of this embodiment is applied to the optical element 10 of the related art shown in FIG. 14. FIG. 15 is an explanatory view when the manufacturing method of this embodiment is applied to the optical element 10 of the related art. In this case, it is possible to seal the container 18 using a process similar to that shown in FIGS. 5A and 5B. However, as shown in FIG. 15, it is conceivable that at the second end wall 14 of the sealed container 18, the second liquid 22 does not stay on the water repellent film 32 but advances to the hydrophilic film 34. In this situation, an attempt to move the first liquid 20 inward and displace the second liquid 22 from the hydrophilic film 34 by applying the voltage across first and second electrodes 24 and 26 will not be successful because of the high wettability of the first liquid 20 to the hydrophilic film 34, so that it is difficult to move the first liquid 20 on the hydrophilic film 34 and position the outer periphery of the second liquid 20 on the water repellent film 32, as shown in FIG. 14. Therefore, when the optical element 10 of the related art is manufactured, it is difficult to apply the manufacturing method of this embodiment and the following manufacturing method therefore has to be employed. That is, in the manufacturing method of the related art, to position the second liquid 22 on the water repellent film 32 in the container 18, a special apparatus, such as a syringe, has to be used to pour the second liquid 22 from outside of the container 18 onto the water repellent film 32 in the container 18 while each volume of the first liquid 20 and the second liquid 22 has to be precisely controlled and poured in the container 18, disadvantageously resulting in a complex and cumbersome manufacturing process. In contrast, in the manufacturing method of this embodiment, a special apparatus, such as a syringe, may not be required and each volume of the first liquid 20 and the second liquid 22 can be easily determined, providing an advantage in simplifying the manufacturing process and increasing the efficiency thereof.

Figure 6:
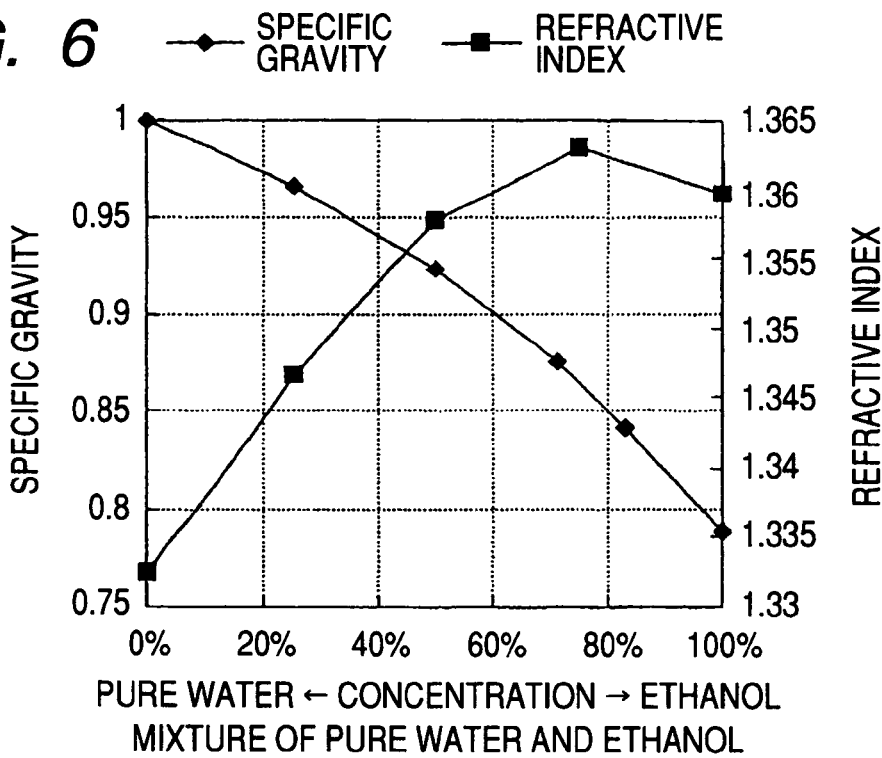
FIG. 6 is a diagram showing the characteristics of specific gravity and refractive index of pure water and ethanol vs. the mixing ratio thereof.
Figure 7:
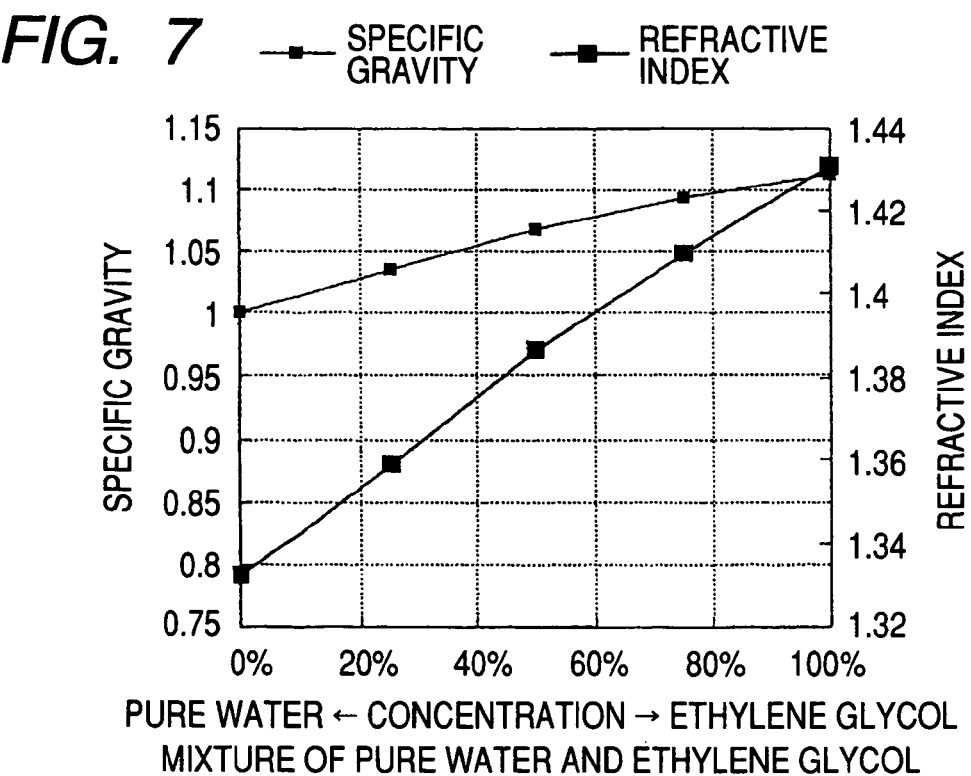
FIG. 7 is a diagram showing the characteristics of specific gravity and refractive index of pure water and ethylene glycol vs. the mixing ratio thereof.
Figure 8:
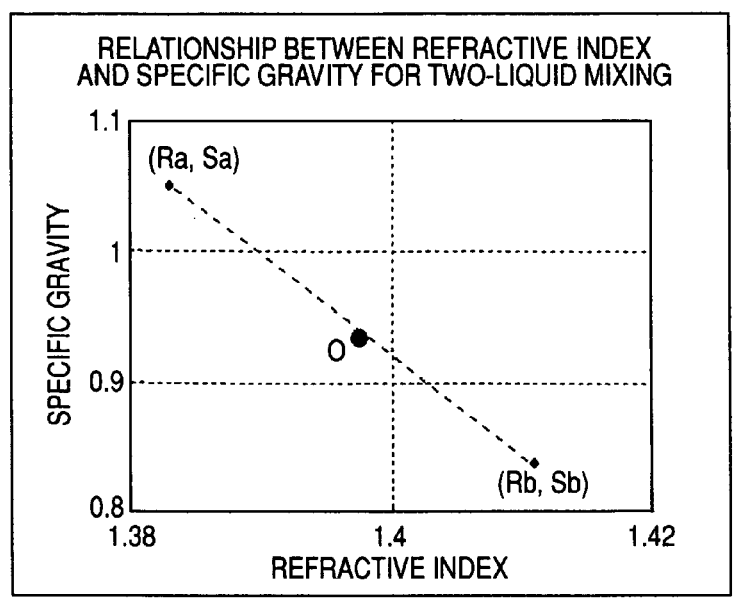
FIG. 8 shows an adjustment range for the refractive index and specific gravity when two types of liquid A and B are mixed.
Figure 9:
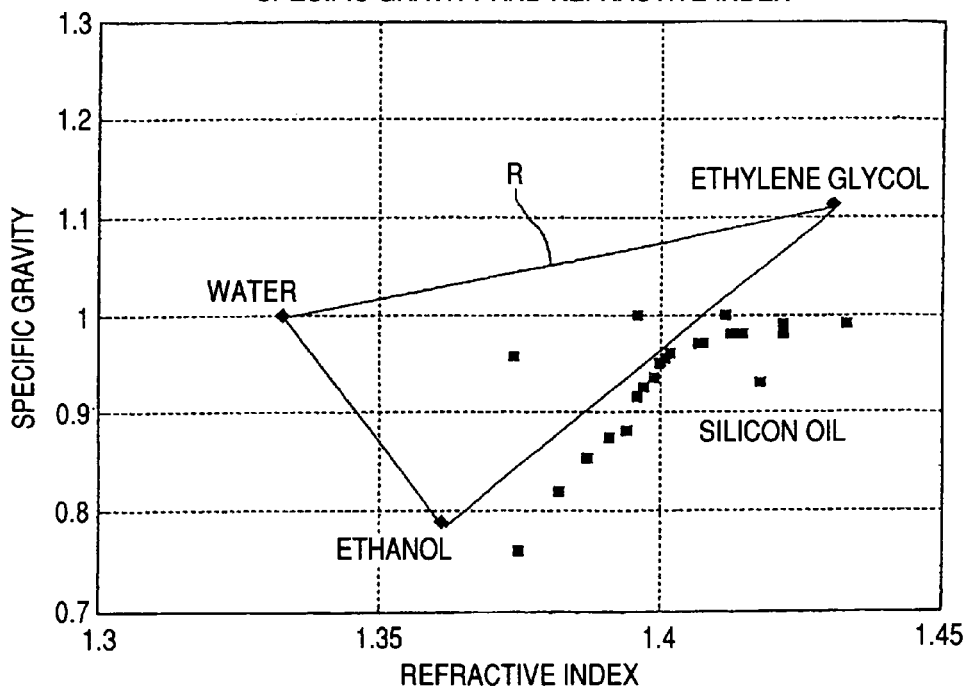
FIG. 9 shows the specific gravity and refractive index of pure water, ethanol and ethylene glycol.
Figure 10:
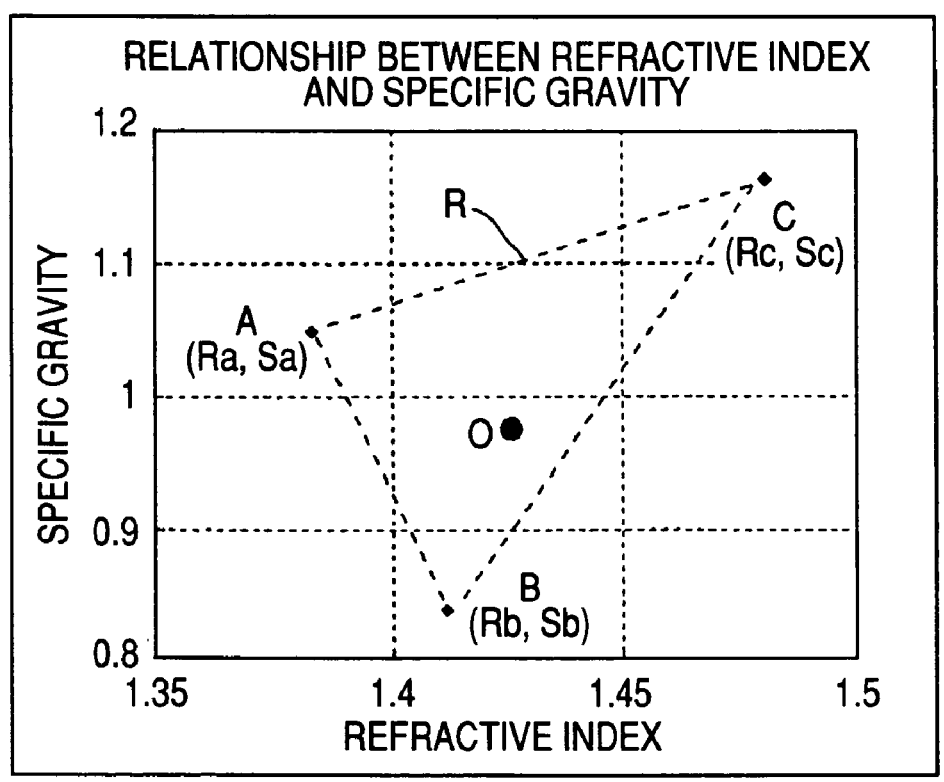
FIG. 10 shows an adjustment range for the refractive index and specific gravity when three types of liquid A, B and C are mixed.

The first liquid 44 and the second liquid 46 used in this embodiment will now be described. The inventors have found that when three types of liquid having specific gravities and refractive indices different from each other are mixed to provide the first liquid 44, changing the mixing ratio of the three types of liquid can provide a wide-range change in specific gravity and refractive index of the first liquid 44. For example, a description will be first given as to a case where two types of liquid are used to provide the first liquid 44. Pure water and ethanol are used as the two types of liquid and they are mixed at various mixing ratios to provide the first liquid 44. As shown in FIG. 6, the specific gravity and refractive index of the first liquid 44 changes following a line or curve as the mixing ratio of the pure water and ethanol changes. Alternatively, pure water and ethylene glycol are used as the two types of liquid and they are mixed at various mixing ratios to provide the first liquid 44. As shown in FIG. 7, the specific gravity and refractive index of the first liquid 44 changes following a line or curve as the mixing ratio of the pure water and ethylene glycol changes. Pure water has a specific gravity of 1.0 and a refractive index of 1.333. Ethanol has a specific gravity of 0.789 and a refractive index of 1.361. Ethylene glycol has a specific gravity of 1.113 and a refractive index of 1.430. That is, as shown in FIG. 8, when the first liquid 44 is formed by mixing the two types of liquid; liquid A (having refractive index Ra and specific gravity Sa) and liquid B (having refractive index Rb and specific gravity Sb), the refractive index and specific gravity of the first liquid 44 can be adjusted by changing the mixing ratio of the liquid A and B, but they can only be adjusted such that they stay on the line connecting the coordinates (Ra, Sa) and (Rb, Sb), as shown by the coordinate O in the figure.

contrast, a description will be given as to a case where three types of liquid are used and the mixing ratio thereof is changed to provide the first liquid 44. For example, pure water, ethanol and ethylene glycol are used as the three types of liquid and the mixing ratio thereof is changed to provide the first liquid 44. As shown in FIG. 9, by changing the mixing ratio of the pure water, ethanol and ethylene glycol, the specific gravity and refractive index of the first liquid 44 can be changed within a large triangular region R formed by connecting three coordinates for the pure water, ethanol and ethylene glycol. That is, as shown in FIG. 10, when the first liquid 44 is formed by mixing three types of liquid; liquid A (having refractive index Ra and specific gravity Sa), liquid B (having refractive index Rb and specific gravity Sb) and liquid C (having refractive index Rc and specific gravity Sc), the refractive index and specific gravity of the first liquid 44 can be adjusted by changing the mixing ratio of the liquid A, B and C in a triangular region R formed by connecting the coordinates of (Ra, Sa), (Rb, Sb) and (Rc, Sc), as shown by the coordinate 0 in the figure. In FIG. 9, coordinates representing specific gravities and refractive indices of various commercially available silicon oils are also indicated in a scattered manner. Therefore, one of the commercially available silicon oils scattered in the triangular region R can be used as the second liquid 46 to derive the first liquid 44 in which pure water, ethanol and ethylene glycol are mixed such that the resultant specific gravity and refractive index are substantially equal to those of the silicon oil.

The first liquid 44 is formed by mixing the liquid mixture of pure water, ethanol and ethylene glycol with carbon black, which is a material that does not transmit light. Therefore, the first liquid 44 with carbon black mixed displays a black color and is formed to be able to block light with a thickness of about 0.1 mm, providing an advantage in reducing the thickness of the optical element. Carbon black may of course be replaced with a dye as a material that does not transmit light. Configuring the first liquid 44 and the second liquid 46 such that they have substantially a same refractive index prevents a lens effect from being created at the interface 60, providing an advantage in reliably performing the diaphragm operation. Mixing ethanol and water to form the first liquid 44 can lower the freezing point (melting point) thereof and hence prevent the first liquid 44 from freezing in cold climates, allowing the optical element 40 to be used in cold climates. Since the freezing points of ethanol and ethylene glycol are –114 degrees and –13 degrees, respectively, the optical element 40 can be configured such that the freezing point of the first liquid 44 is –40 degrees or lower.

The optical element 40 is configured such that three types of existing liquid with different specific gravities are mixed to form the first liquid 44, unlike in the related art in which the first liquid 44 and the second liquid 46 are selected such that they have a same specific gravity, so that the specific gravity of the first liquid 44 can be changed within a wide range, as shown in the region R in FIG. 9. That is, when two types of liquid with specific gravities different from each other are mixed, the specific gravity of the first liquid 44 provided by changing the mixing ratio of the two types of liquid is limited within a range defined by a line connecting the coordinates for the two types of liquid, as shown in FIG. 8. In contrast, when three types of liquid are mixed, as shown in FIG. 9, the specific gravity of the first liquid 44 can be changed within the large triangular region R formed by connecting three coordinates for pure water, ethanol and ethylene glycol. Therefore, the specific gravity of the first liquid 44 can easily be made substantially equal to the specific gravity of the second liquid 46, allowing the optical element 40 having a desired property to be easily manufactured. Furthermore, as shown in FIGS. 9 and 10, since the first liquid 44 is obtained by mixing at least three types of liquid with different refractive indices as well as different specific gravities, for example, pure water, ethanol and ethylene glycol, the specific gravity of the first liquid 44 can easily be made substantially equal to the specific gravity of the second liquid 46, while the refractive index of the first liquid 44 can easily be made substantially equal to the refractive index of the second liquid 46, providing an advantage in preventing a lens effect from being created.

Figure 11:
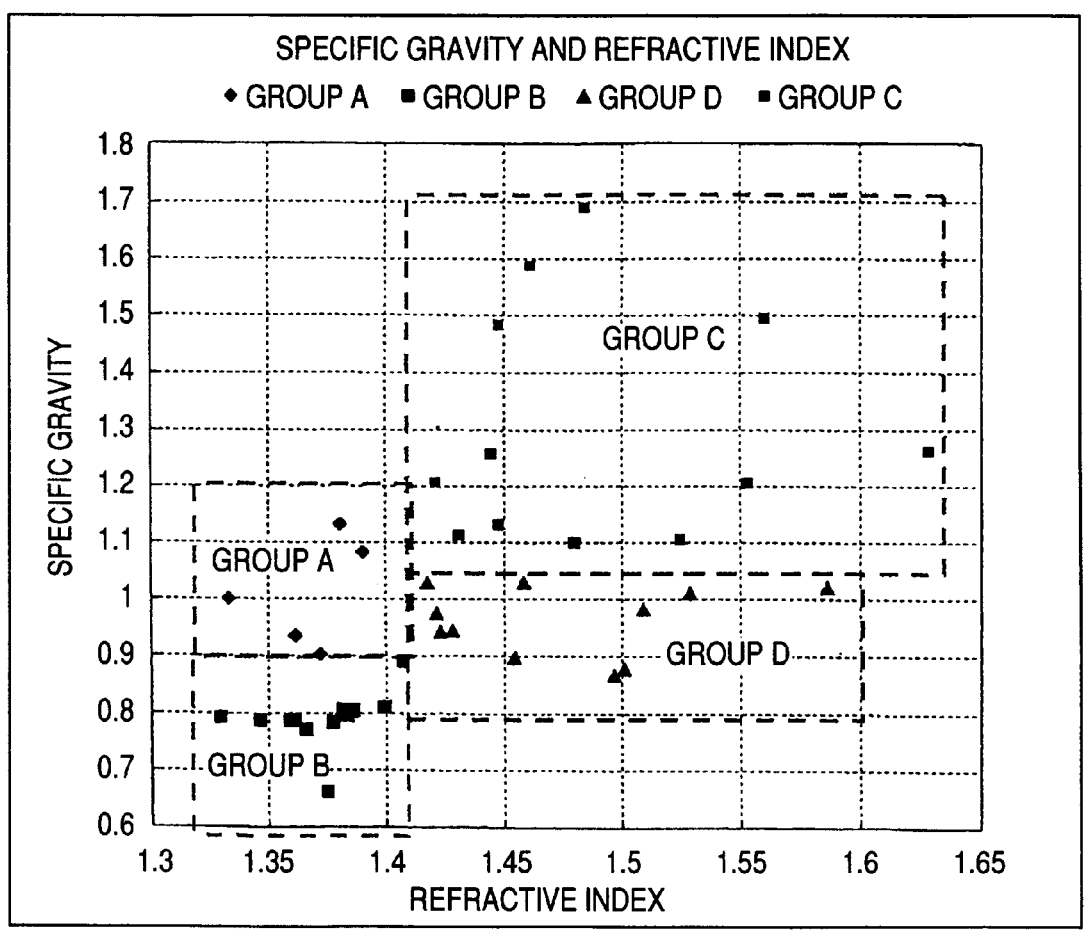
FIG. 11 shows the specific gravities and refractive indices of various types of liquid.

Although the description of the optical element 40 has been made as to the case where pure water, ethanol and ethylene glycol are used as the multiple types of liquid to provide the first liquid 44, the multiple types of liquid to be used are not limited to pure water, ethanol and ethylene glycol, but various types of existing liquid may be selected. FIG. 11 shows specific gravities and refractive indices of various types of liquid. FIG. 12 shows values of specific gravity and refractive index of the various types of liquid to be used. For example, FIG. 11 shows groups A, B, C and D for liquid to be used, and FIG. 12 shows specific names of liquid used in the groups A, B, C and D. Liquid in the group A has a refractive index of at least 1.32 but less than 1.41 and a specific gravity of at least 0.9 but less than 1.2. Liquid in the group B has a refractive index of at least 1.32 but less than 1.41 and a specific gravity of at least 0.6 but less than 0.9. Liquid in the group C has a refractive index of at least 1.41 but less than 1.63 and a specific gravity of at least 1.05 but less than 1.7. Liquid in the group D has a refractive index of at least 1.41 but less than 1.6 and a specific gravity of at least 0.8 but less than 1.05. Therefore, when three types of liquid are selected from three groups arbitrary selected from the groups A to D, the specific gravity and refractive index can be changed by changing the mixing ratio of the selected three types of liquid in a large triangular region formed by connecting the coordinates for the selected three types of liquid. That is, the specific gravity and refractive index can be easily changed by selecting various conventionally known liquid and changing the mixing ratio thereof.

Figure 13:
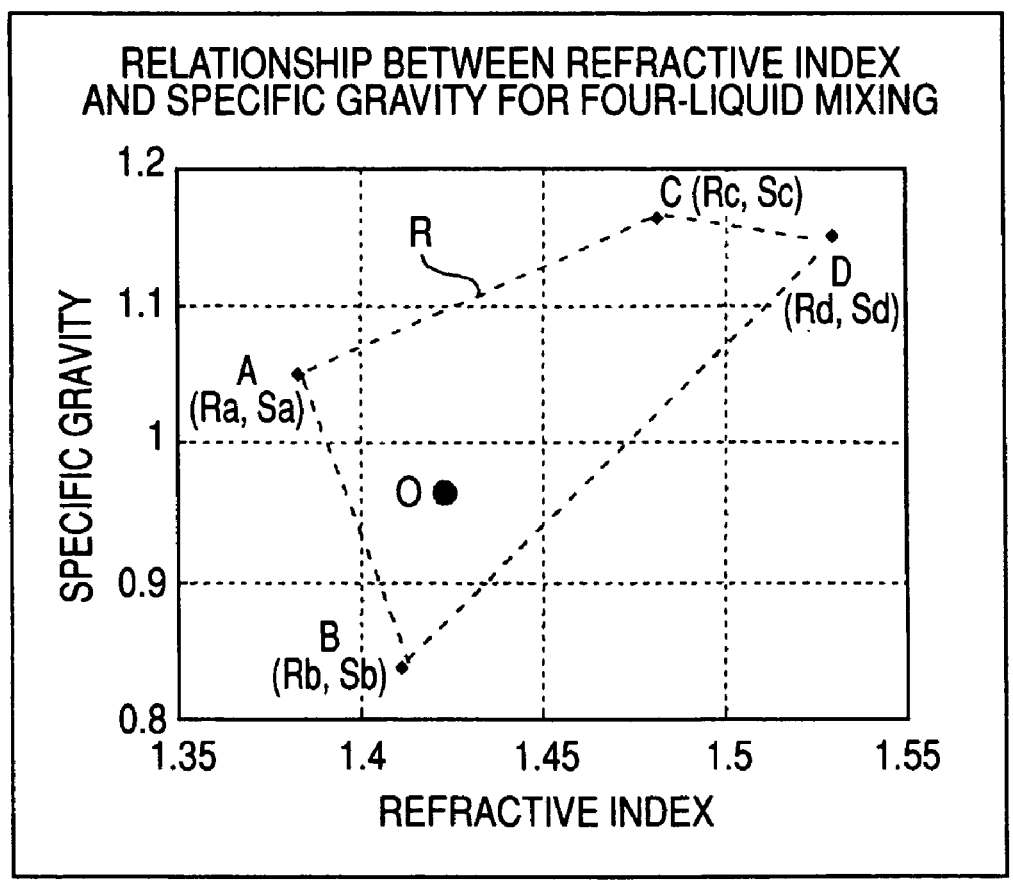
FIG. 13 shows an adjustment range for the refractive index and specific gravity when four types of liquid A, B, C and D are mixed.

The number of types of liquid used for the first liquid is not limited to three, but may be four or more. As shown in FIG. 13, when the first liquid 44 is formed by mixing four types of liquid; liquid A (having refractive index Ra and specific gravity Sa), liquid B (having refractive index Rb and specific gravity Sb), liquid C (having refractive index Rc and specific gravity Sc) and liquid D (having refractive index Rd and specific gravity Sd), the refractive index and specific gravity of the first liquid 44 can be easily adjusted by changing the mixing ratio of the liquid A, B, C and D in a quadrangular region R formed by connecting coordinates (Ra, Sa), (Rb, Sb), (Rc, Sc) and (Rd, Sd), as shown by the coordinate O in the figure. Again, a commercially available silicon oil (not shown) positioned in the quadrangular region R can be used as the second liquid 46 to derive the first liquid 44 in which the four types of liquid are mixed such that the resultant specific gravity and refractive index are substantially equal to those of the silicon oil.

Although the optical element 40 of this embodiment has been described with reference to the case where only one silicon oil is used as the second liquid 46, silicon oils themselves are available with different properties, such as refractive index and specific gravity, so that one type of silicon oil with a desired property may be selected and used as the second liquid 46, or multiple types of silicon oils with different properties may be selected and used as the second liquid 46 after changing the mixing ratio of the selected silicon oils to impart desired refractive index and specific gravity. Furthermore, although the description of the optical element 40 has been made as to the case where a direct voltage is applied to the first liquid 44 to induce the electrowetting phenomenon, the voltage applied to the first liquid 44 is not limited to a direct voltage, but may be any type of voltage, such as an alternating voltage or a pulse voltage, or an incrementing or decrementing voltage as long as it induces an electrowetting phenomenon in the first liquid 44.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical element, comprising:
a sealed container having a first end wall facing a second end wall in a thickness direction, and a sidewall connecting the first and second end walls;
a first polar or conductive liquid encapsulated in the container;
a second liquid encapsulated in the container and not mixed with the first liquid so as to form an interface between the first liquid and the second liquid, the first liquid and the second liquid having substantially the same specific gravity and the first liquid having less light transmittance than the second liquid;
voltage application means for applying a voltage to the first liquid, the voltage application means including a first electrode provided on the first end wall, at least part of the first electrode facing the inside of the container, a second electrode provided on the second end wall, at least part of the second electrode facing the inside of the container, and an insulating film covering the part of the second electrode facing the inside of the container,
a first film formed on the entire inner surface of the first end wall, on the part of the first electrode facing the inside of the container, and on the entire inner surface of the sidewall, the first film having a higher wettability to the first liquid than to the second liquid; and
a second film formed on the entire inner surface of the second end wall, on the part of the second electrode facing the inside of the container, and on the insulating film, the second film having a higher wettability to the second liquid than to the first liquid, wherein
when a voltage is applied to the first liquid, the interface between the first liquid and the second liquid deforms to form a light transmission path that passes through the first and second end walls and extends in the thickness direction of the container, and
when no voltage is applied to the first liquid, the second liquid is positioned against the second film, while the first liquid entirely extends in a direction perpendicular to the light transmitting direction and an outer periphery of the first liquid that faces the inner surface of the sidewall is positioned over the second electrode via the second film and the insulating film.

2. The optical element according to claim 1, wherein the first electrode is formed on the entire inner surface of the first end wall and the first film covers the entire first electrode.

3. The optical element according to claim 1, wherein a portion of the first liquid always faces an outer periphery of the first end wall irrespective of how the interface deforms, and the first electrode is formed at the outer periphery of the first end wall.

4. The optical element according to claim 1, wherein
the light transmission path extends in the thickness direction of the container through centers of the first and second end walls, the size of the light transmission path at the first end wall changing as the interface deforms, and
the first electrode is formed in an annular region that is part of the first end wall and does not include the maximized light transmission path.

5. The optical element according to claim 1, wherein the second electrode is formed on the entire inner surface of the second end wall and the second film covers the entire second electrode.

6. The optical element according to claim 1, wherein the light transmission path has a circular cross-section, a portion of the first liquid always faces an outer periphery of the second end wall irrespective of how the interface deforms, the portion of the first liquid that faces the outer periphery of the second end wall is enlarged or reduced in the radial direction of the light transmission path as the interface deforms, and the second electrode is disposed at the portion of the first liquid that faces the outer periphery of the second end wall.

7. The optical element according to claim 1, wherein
the light transmission path extends in the thickness direction of the container through the centers of the first and second end walls, the size of the light transmission path at the second end wall changing as the interface deforms, and
the second electrode is formed in an annular region that is part of the second end wall and does not include the maximized light transmission path.

8. The optical element according to claim 1, wherein the second liquid is formed of a silicon oil.

9. The optical element according to claim 1, wherein the second film is formed of a material primarily made of silicon.

10. The optical element according to claim 1, wherein the second film is formed of a material made of amorphous fluororesin.

11. The optical element according to claim 1, wherein a contact angle between the second liquid and the second film is between 0 and 30 degrees.

12. The optical element according to claim 1, wherein the interface between the first liquid and the second liquid maintains a convex curved shape from the first liquid toward the second liquid regardless of whether a voltage is applied to the first liquid.

13. The optical element according to claim 1, wherein the first liquid is formed of a plurality of types of liquid and the plurality of types of liquid include at least one of water, ethanol and ethylene glycol.

14. A method for manufacturing an optical element, the optical element including:
a sealed container having a first end wall facing a second end wall in a thickness direction, and a sidewall connecting the first and second end walls;
a first polar or conductive liquid encapsulated in the container;
a second liquid encapsulated in the container and not mixed with the first liquid so as to form an interface between the first liquid and the second liquid, the first liquid and the second liquid having substantially the same specific gravity and the first liquid having less light transmittance than the second liquid; and
voltage application means for applying a voltage to the first liquid, wherein
when a voltage is applied to the first liquid, the interface between the first liquid and the second liquid deforms to form a light transmission path that passes through the first and second end walls and extends in the thickness direction of the container, the method comprising:
configuring the container with a body including the first end wall, the sidewall and an open end, and a lid for enclosing the open end, the lid including the second end wall;
forming a first film on the entire inner surface of the first end wall, and on the entire inner surface of the sidewall, the first film having a higher wettability to the first liquid than to the second liquid;
forming a second film on the entire inner surface of the second end wall, the second film having a higher wettability to the second liquid than to the first liquid;
mounting the body on a mounting surface with the open end of the body oriented upward;
filling the body with the first liquid to an upper end of the sidewall;
pouring the second liquid on the first liquid to position the second liquid on the first liquid;
joining the lid and the upper end of the sidewall in a liquid-tight manner with the second end wall facing the upper surface of the second liquid.

15. An optical element, comprising:
a sealed container having a first end wall facing a second end wall in a thickness direction, and a sidewall connecting the first and second end walls;
a first polar or conductive liquid encapsulated in the container;
a second liquid encapsulated in the container and not mixed with the first liquid so as to form an interface between the first liquid and the second liquid, the first liquid and the second liquid having substantially the same specific gravity and the first liquid having less light transmittance than the second liquid;
a voltage application unit configured to apply a voltage to the first liquid, the voltage application unit including a first electrode provided on the first end wall, at least part of the first electrode facing the inside of the container, a second electrode provided on the second end wall, at least part of the second electrode facing the inside of the container, and an insulating film covering the part of the second electrode facing the inside of the container;
a first film formed on the entire inner surface of the first end wall, on the part of the first electrode facing the inside of the container, and on the entire inner surface of the sidewall, the first film having a higher wettability to the first liquid than to the second liquid; and a second film formed on the entire inner surface of the second end wall, on the part of the second electrode facing the inside of the container, and on the insulating film, the second film having a higher wettability to the second liquid than to the first liquid, wherein when a voltage is applied to the first liquid, the interface between the first liquid and the second liquid deforms to form a light transmission path that passes through the first and second end walls and extends in the thickness direction of the container, and when no voltage is applied to the first liquid, the second liquid is positioned against the second film, while the first liquid entirely extends in a direction perpendicular to the light transmitting direction and an outer periphery of the first liquid that faces the inner surface of the sidewall is positioned over the second electrode via the second film and the insulating film.

* * * * *